United States Patent [19]

Hulin et al.

[11] 4,441,786

[45] Apr. 10, 1984

[54] DEVICE FOR POSITIONING OPTICAL FIBERS IN A TERMINAL CONNECTOR FOR SPLICING TWO OPTICAL FIBER TRANSMISSION CABLES

[75] Inventors: Jean P. Hulin; André Bouvard; Patrick LeMaitre, all of Conflans Ste Honorine, France

[73] Assignee: Lignes Telegraphiques et Telephoniques, Conflans Ste Honorine, France

[21] Appl. No.: 316,912

[22] Filed: Oct. 30, 1981

[30] Foreign Application Priority Data

Nov. 3, 1980 [FR] France ............................ 80 23464

[51] Int. Cl.³ .................................................. G02B 7/26
[52] U.S. Cl. .................... 350/96.21; 350/96.2; 350/96.22
[58] Field of Search .................. 350/96.2, 96.21, 96.22

[56] References Cited

U.S. PATENT DOCUMENTS 4,253,730 3/1981 Logan et al. .................... 350/96.21
4,258,977 3/1981 Lukas et al. .................... 350/96.21
4,416,507 11/1983 Hulin et al. .................... 350/96.22

FOREIGN PATENT DOCUMENTS 2420777 10/1979 France .............................. 350/96.21

Primary Examiner—David K. Moore
Assistant Examiner—Brian Healy
Attorney, Agent, or Firm—Cushman, Darby & Cushman

[57] ABSTRACT

A device is provided for positioning optical fibers in a terminal connector for splicing two optical-fiber transmission cables, said device comprising an optical-fiber insertion piece having a central recess in which is fitted a terminal connector provided with grooves, and radial slits provided on the periphery of said insertion piece, and optical-fiber distribution means mounted freely rotatable on said insertion piece and having a longitudinal slit intended to come successively opposite each slit of said insertion piece, so that, by rotation of said distribution means, each optical fiber penetrates into a groove of said terminal connector through the slit of said distribution means positioned opposite a slit of said insertion piece.

13 Claims, 2 Drawing Figures

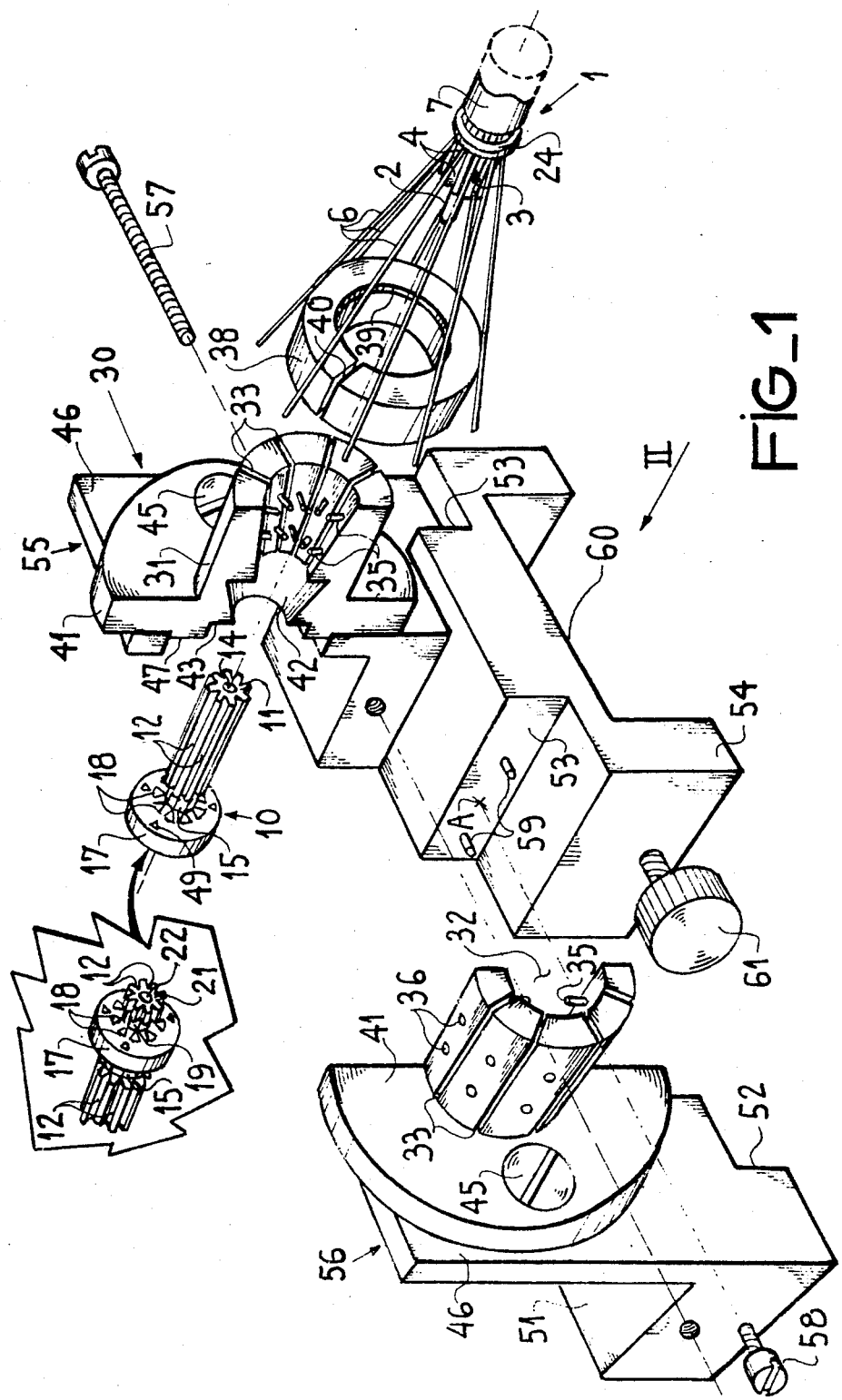

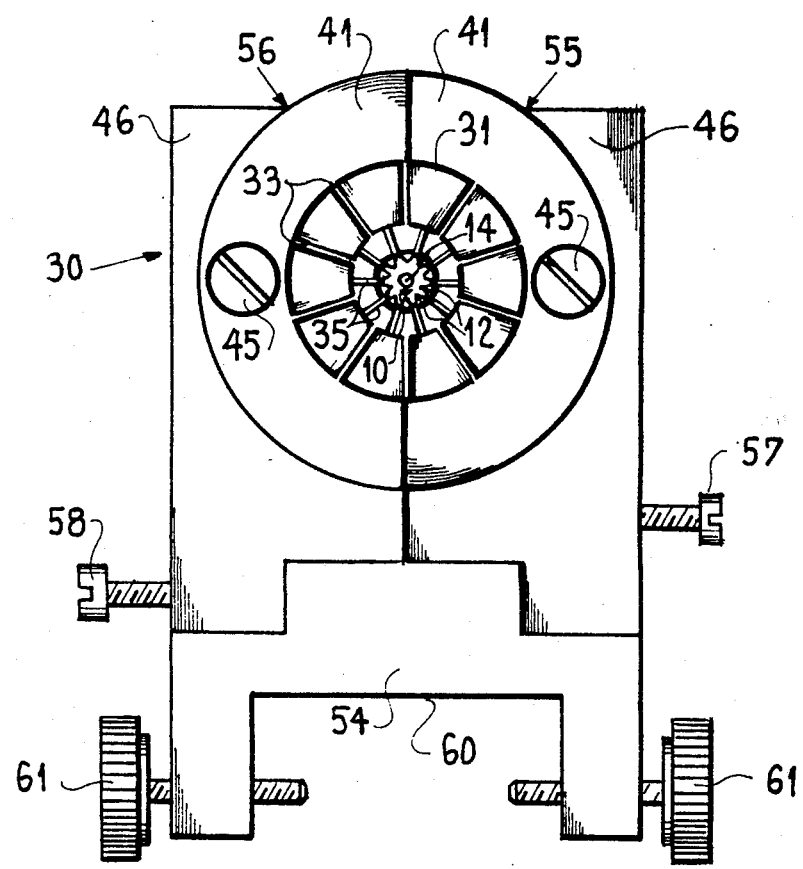
FIG_2

DEVICE FOR POSITIONING OPTICAL FIBERS IN A TERMINAL CONNECTOR FOR SPLICING TWO OPTICAL FIBER TRANSMISSION CABLES

BACKGROUND AND SUMMARY OF THE PRESENT INVENTION

The present invention relates to a device for positioning optical fibers in a terminal connector intended for splicing two optical-fiber transmission cables each comprising, under a protection sheath, a dielectric cylindrical support reinforced along its axis and comprising grooves, either longitudinal or helical, disposed evenly over its periphery and in each of which is housed an optical fiber.

Methods and devices are already known for connecting or splicing such optical-fiber transmission cables. Reference may be made for example to the French Patent No. 2,420,777 filed by the present Assignee on Mar. 24, 1978 for "Method and apparatus for splicing optical-fiber cables". According to this patent, the method of splicing two optical-fiber transmission cables comprises the following steps carried out at each end of cable:

the ends of the cables are stripped over a predetermined length;

the fibers thus freed are opened outwardly and are temporarily fixed on a support surrounding the cable;

the support, freed of its fibers, is cut perpendicularly to its axis and a terminal connector is rigidly fixed thereto, comprising grooves disposed evenly over its periphery, and having the same angular spacing as the grooves of the support of said cable;

the fibers are brought down into the grooves of this connector and they are rigidly fixed therein;

this connector as well as the fibers which it carries are cut perpendicularly to its axis and said connector is polished;

each of the support-connector assemblies is permanently fixed with rigidifying means;

the two cut faces are placed in contact and the two cables are aligned with aligning means; and the two cut faces are pressed together by appropriate clamping means.

However, the operation of the above-described method consisting in bringing down the fibers, for example by means of pincers, more particularly of the tweezer type, into the grooves of the terminal connector, presents disadvantages. In fact, this operation is carried out manually, so making use of the dexterity of the operator. Thus, it may happen through clumsiness that two optical fibers are positioned in the same groove of the terminal connector. Consequently, perfect execution of this operation of positioning an optical fiber in each groove of the connector cannot be guaranteed. Furthermore, this operation may require a relatively large force to be exerted on the optical fiber in order to position it in a groove, which may even cause said fiber to break. Moreover, this operation takes a relatively long time to carry out, which appreciably increases the time for splicing, particularly in situ, two optical-fiber transmission cables.

The aim of the present invention is to overcome these disadvantages by providing a mechanical device for positioning optical fibers in grooves of the terminal connector for splicing two optical-fiber transmission cables of the above-described type, which is entirely satisfactory, simple in structure, reliable and ensures rapid and strict positioning of a single optical fiber per groove, thus eliminating the human factors.

To this end, the object of the invention is a device for positioning optical fibers in grooves formed in the periphery of a terminal connector intended for splicing two optical-fiber transmission cables, comprising:

an optical-fiber insertion piece comprising a central recess provided substantially over all its length and radial slits provided in the periphery of the insertion piece and extending substantially over all the length of this insertion piece, the terminal connector being fitted into the central recess so that each of its grooves is disposed opposite a slit in the insertion piece; and optical-fiber distribution means mounted freely rotatable on the insertion piece and having an additional longitudinal slit intended to come successively opposite each slit of the insertion piece, the optical fibers being presented one by one to the additional slit of the distribution means so that, through rotation of the distribution means, each optical fiber penetrates into a groove of the terminal connector through the slit of the distribution means located opposite a slit in the insertion piece.

According to another feature of the invention, the distribution means comprise a ring mounted in abutment on one end of the insertion piece, the optical fibers being disposed bearing on the outer periphery of the ring.

It will be readily understood that thus, once the end of the cable has been stripped over a predetermined length, the optical fibers thus freed will come and open out around the ring which will successively present, by rotation, each slit to each optical fiber, so that said fiber will pass down into a slit of the insertion piece and will be easily positioned in a groove of the terminal connector. Thus, this rotating ring for distributing optical fibers forms a simple and efficient means facilitating more especially the operation of positioning each optical fiber in a groove of the terminal connector.

BRIEF DESCRIPTION OF THE ACCOMPANYING DRAWINGS

Other features and advantages of the invention will become more readily apparent upon consideration of the following description and accompanying drawings, wherein:

FIG. 1 is a perspective view, with exploded parts, of the positioning device of the invention, with the transmission cable to be connected and with the terminal connector whose two endmost parts are shown separately; and FIG. 2 is a view along arrow II of FIG. 1, the parts of the device of the invention being assembled, with the terminal connector fitted into the insertion piece of the device.

DETAILED DESCRIPTION OF THE PREFERRED EXEMPLARY EMBODIMENT

According to a preferred embodiment, and with reference to FIG. 1, there is shown at 1 the end of an optical-fiber transmission cable intended to be connected to another identical cable (not shown). This cable element 1 comprises a central core 2 for rigidifying the cable and absorbing the longitudinal stresses, about which is disposed a cylindrical dielectric support 3 having longitudinal or helical grooves 4, with a V-shaped profile for example, distributed uniformly over the external surface of support 3. Inside each groove 4 is housed an optical fiber 6, and the sheath for protecting cable 1 is shown at 7.

To splice two optical-fiber transmission cables of the type shown at 1 in FIG. 1, it is customary to rigidly fix a terminal connector such as shown at 10 with support 3 of the cable. This connector 10 comprises a first cylindrical part 11 of the same diameter as support 3, and having longitudinal parallel grooves 12, with a V-shaped profile for example, distributed uniformly over the external periphery of the cylindrical part 11 at the same angular spacing as the grooves 4 of support 3 of the cable. This first cylindrical part 11 also comprises a central throughbore 14 for receiving the central core 2 of cable 1, as will be explained hereinafter.

This cylindrical part 11 is terminated by a first circular groove 15 whose diameter, less than that of cylindrical part 11, is chosen slightly greater than the diameter of the circle inscribed by the bottoms of the grooves, the depth of the grooves at the cylindrical part 11 being identical to those of support 3 of the cable. This first groove 15 is extended by an annular flange 17 having a central recess (not shown) provided over all its length, and a plurality of longitudinal openings 18, provided over all the length of flange 17, and spread out evenly around said recess, with the same angular spacing as grooves 12 of cylindrical part 11. Each opening 18 has the shape of a V whose tip is directed towards the recess. Thus, each opening 18 is exactly in the extension of each groove 12 of cylindrical part 11.

The flange 17 is terminated by a second circular groove 19, identical to groove 15, and having the same diameter as this latter. The groove 19 is extended by a second cylindrical part 21, identical to cylindrical part 11, i.e. having the same diameter and grooves at the same angular spacing. The length of this second cylindrical part 21 is less than that of part 11, and may comprise a central bore 22 whose diameter is less than that of bore 14 of part 11.

Advantageously, this terminal connector 10 is obtained by molding a symmetrical piece which, by cutting along its plane of symmetry, gives two matched connectors 10 which will be respectively fixed to the two ends of the cables to be spliced.

As shown in FIG. 1, the first operations to be carried out for splicing two optical-fiber transmission cables consist first in stripping the ends of the cables 1 over a predetermined length, inserting a flexible O-ring 24 around support 3, opening out the thus freed fibers 6 and cutting perpendicular to its axis support 3 feed of its fibers. The next operation consists in positioning and maintaining the optical fibers 6 in grooves 12 of the terminal connector 10 and fixing them rigidly therein, and assembly the terminal connector 10 with support 3 of the cable.

The above-described operation consisting in positioning the optical fibers 6 in grooves 12 of the connector 10 is carried out by means of the device of the invention which will now be described.

This positioning device 30 comprises a cylindrical piece 31 having substantially the same length as the first cylindrical part 11 of terminal connector 10, and aligned coaxially with cable 1. This piece 31, adapted for positioning the fibers in the grooves of the terminal connector 10, comprises a central recess 32, conical in shape, provided substantially over all its length, and a plurality of radial slits 33 having a width slightly greater than the diameter of the optical fibers 6, and extending substantially over all the length of said piece 31. These slits 33 are distributed evenly over the periphery of cylindrical piece 31, and are spaced apart with the same angular spacing as grooves 4 of support 3, and so with the same angular spacing as grooves 12 and openings 18 of terminal connector 10.

The cylindrical member 31 also comprises metal pegs 35 of the same length, projecting radially towards the inside of recess 32 of cylindrical member 31. These pegs 35, arranged circularly and divided for example into two rows over the length of cylindrical member 31, are respectively mounted between two slits 33. There are shown at 36 the openings provided in piece 31 through which pegs 35 are engaged.

The projecting parts of pegs 35 thus distributed define a central passage for the cylindrical part 11 of connector 10, and the length of the pegs is determined so that this cylindrical part 11 comes substantially into contact with said pegs. Thus, these pegs 35 form means for holding the cylindrical part 11 of connector 10, once this latter is fitted in cylindrical piece 31, as shown in FIG. 2.

The positioning device 30 also comprises a flexible ring 38, made for example from a plastic material, whose bore has a shoulder 39 serving as an abut when the ring is positioned on the end of cylindrical piece 31. This ring 38, provided with a longitudinal slit 40 of a width slightly greater than the diameter of fibers 6, is rotatably mounted on the cylindrical piece 31.

The end of cylindrical piece 31, opposite to that on which ring 38 is mounted, is integral with a cylindrical member forming a mounting 41 comprising a hollow central conical part 42, serving as guide stock, and formed in the extension of the recess 32 of cylindrical piece 31. The unit formed by recess 32 and hollow part 42 has a depth substantially equal to the length of the cylindrical part 11-groove 15 of connector 10 assembly. The hollow part 42 is terminated by a circular housing, having the same diameter as flange 17 and presenting a shoulder 43 serving as an abut for said flange when the terminal connector 10 is fitted into cylindrical piece 31.

The assembly formed by members 31 and 41 is fixed, for example by means of two screws 45 mounted in member 41, to a plate forming a support 46. This support 46 comprises a central circular housing of a diameter greater than the housing of hollow part 42, and having a shoulder 47 serving as an abutter.

The way by which the positioning device which has just been described is used will now be explained.

After stripping the end of cable 1 and cutting support 3 freed of its fibers, device 30 is positioned so that the optical fibers 6 open out evenly around ring 38 mounted on cylindrical member 31. The terminal connector 10 is then fitted into the cylindrical member 31, i.e. with its flange 17 in abutment against shoulder 43 and its cylindrical part 11 positioned in the central recess 32 (FIG. 1). The grooves 12 of the cylindrical part 11 of the connector are placed respectively opposite slits 33 by means of index elements 49, formed for example by three triangular-shaped notches provided in flange 17 of connector 10.

When ring 38 is rotated its slit 40 is successively placed opposite each slit 33 of cylindrical member 31. Each optical fiber 6 will therefore successively penetrate into slit 40 and then pass through a respective slit 33 of member 31. Each fiber 6 then engages in a groove 12 of connector 10, while being downwardly guided by two adjacent pegs 35. Thus, the ring 38 serves as fiber distributor, only allowing a single fiber 6 to be engaged in a groove 12 of the connector 10.

As shown in FIG. 1, the plate forming support 46 comprises a lower part forming a base 51 having a setback 52 coming into abutment against shoulder 53 formed on a member forming a stand 54.

As can be seen in FIG. 1, the unit formed by members 31, 41 and 46 forms a single piece made in two identical parts referenced at 55 and 56. These two parts 55 and 56 may be assembled together by an appropriate fixing means, such for example as a screw 57. Part 55 is secured to stand 54 by any appropriate means, whereas the other part 56 may be withdrawn, by translation, from said stand 54 by means of any appropriate system, such for example as a screw 58 housed in base 51 of part 56, and coming into abutment at A against the shoulder 53 of stand 54. Two studs are shown at 59 for immobilizing part 56 on stand 54.

The stand 54 comprises at its lower part a setback 60 for inserting the positioning device 30 on a connecting bench, and securing means, such for example as two screws 61 placed on each side of stand 54, allow device 30 to be interlocked with said bench.

Once the optical fibers 6 are positioned in grooves 12 of terminal connector 10 as described above, stand 54 is released from the connecting bench by unscrewing screws 61. Then, device 30 is pushed in the direction of cable 1, so that the fibers 6 positioned in the grooves 12 of connector 10 readily penetrate, after passing through the hollow part 42, into the openings 18 of flange 17. Moreover, the core 2 of the cable penetrates into the bore 14 of connector 10, thus securing said connector to the cable. After passing through these openings 18, the fibers are engaged in the grooves of the cylindrical part 21 of connector 10. It will be noted that the central recess 32 of cylindrical member 31 is conical so as to facilitate positioning of the fibers in grooves 12 of connector 10 when said fibers are not all cut to the same length.

Then, the two parts 55 and 56 are disconnected from each other by unscrewing screw 57, and part 56 is withdrawn from stand 54 by the abuting screw 58 imparting a translational motion to said part 56. Then, the positioning device 30 is withdrawn from the connecting bench.

The O-ring 24 is then slided along support 3 and cylindrical part 11 of connector 10, so as to apply fibers 6 to the bottom of the V-shaped grooves, until said ring occupies its final position in groove 15 of the connector. The connector 10 and support 3 are bonded together. On the other side of flange 17, an O-ring (not shown) is introduced into the groove 19 of connector 10 so as to apply the free end of the fibers in the bottom of the grooves and the ends of the fibers are bonded in groove 19. The O-ring occupying groove 19 is then removed by any appropriate means, such for example as a grinding wheel with double granulometry removing the polishing of the fibers. The cable 1-connector 10 assembly is then submitted to a rigidifying operation.

After having proceeded in the same way on the second cable to be connected, the two connectors are then aligned and held in place.

What is claimed is:

1. A device for positioning optical fibers in grooves of a terminal connector for splicing two optical-fiber transmission cables, said connector defining an outer connector periphery in which said grooves are formed, said device comprising:

an optical-fiber insertion piece defining an outer insertion piece periphery and comprising a central recess provided substantially over all its length, and radial slits formed in said outer insertion piece periphery and extending substantially over all the length of said insertion piece, said connector being fitted into said central recess so that each groove is disposed opposite a slit of said insertion piece; and optical-fiber distribution means mounted freely rotatable on said insertion piece and having a longitudinal slit intended to come successively opposite each slit of said insertion piece, the optical fibers being presented one by one to the slit of said distribution means so that, by rotation of said distribution means, each optical fiber penetrates into a groove of said connector through the slit of said distribution means positioned opposite a slit of said insertion piece.

2. A device as claimed in claim 1, wherein said distribution means includes a ring defining an outer ring periphery, said ring mounted in abutment against one end of said insertion piece, said optical fibers being disposed so as to bear on said outer ring periphery.

3. A device as claimed in claim 1 or 2, further comprising optical-fiber guiding elements mounted respectively between two slits of said insertion piece and projecting radially towards the inside of the recess of said insertion piece, said guide elements being distributed about said recess so as to leave a central passage for said connector when it is inserted in said recess.

4. A device as claimed in claim 3, wherein said guide elements are formed by pegs of substantially the same length for allowing optical fibers to be guided for positioning thereof in said grooves of said connector.

5. A device as claimed in claim 3 wherein said guide elements form means for holding the position of said connector in said central recess.

6. A device as claimed in claim 1, wherein the number of slits in said insertion piece is equal to the number of said grooves of said connector.

7. A device as claimed in claim 6, wherein the slits of said insertion piece are spaced apart with substantially the same angular spacing as the grooves of said connector.

8. A device as claimed in claim 1, wherein said central recess is substantially conical in shape.

9. A device as claimed in claim 1, wherein the end of said insertion piece opposite to that on which said ring is mounted is integral with a mounting member comprising a hollow substantial conical central part provided substantially over all its length, said recess of said insertion piece having an extension in which said hollow part is formed.

10. A device as claimed in claim 9, wherein said mounting is fixed to a support mounted on a stand, and wherein said insertion piece, said mounting and said support form a single unit made in two identical parts disconnectable from each other, on of the parts of said unit being secured to said stand.

11. A device as claimed in claim 10, wherein said support comprises means for interlocking the two parts of said unit.

12. A device as claimed in claim 1, wherein said optical fibers are mounted in a transmission cable comprising a central core around which is disposed a dielectric support defining an outer support periphery and having grooves formed in said outer support periphery, each of said grooves housing an optical fiber, the end of each fiber projecting longitudinally from said groove so as to allow each fiber end to be positioned in a groove of said connector fitted into said insertion piece.

13. A device as claimed in claim 12, wherein the grooves of said connector are disposed with the same angular spacing as the grooves of said dielectric support of the cable.

* * * * *